Figure 1:
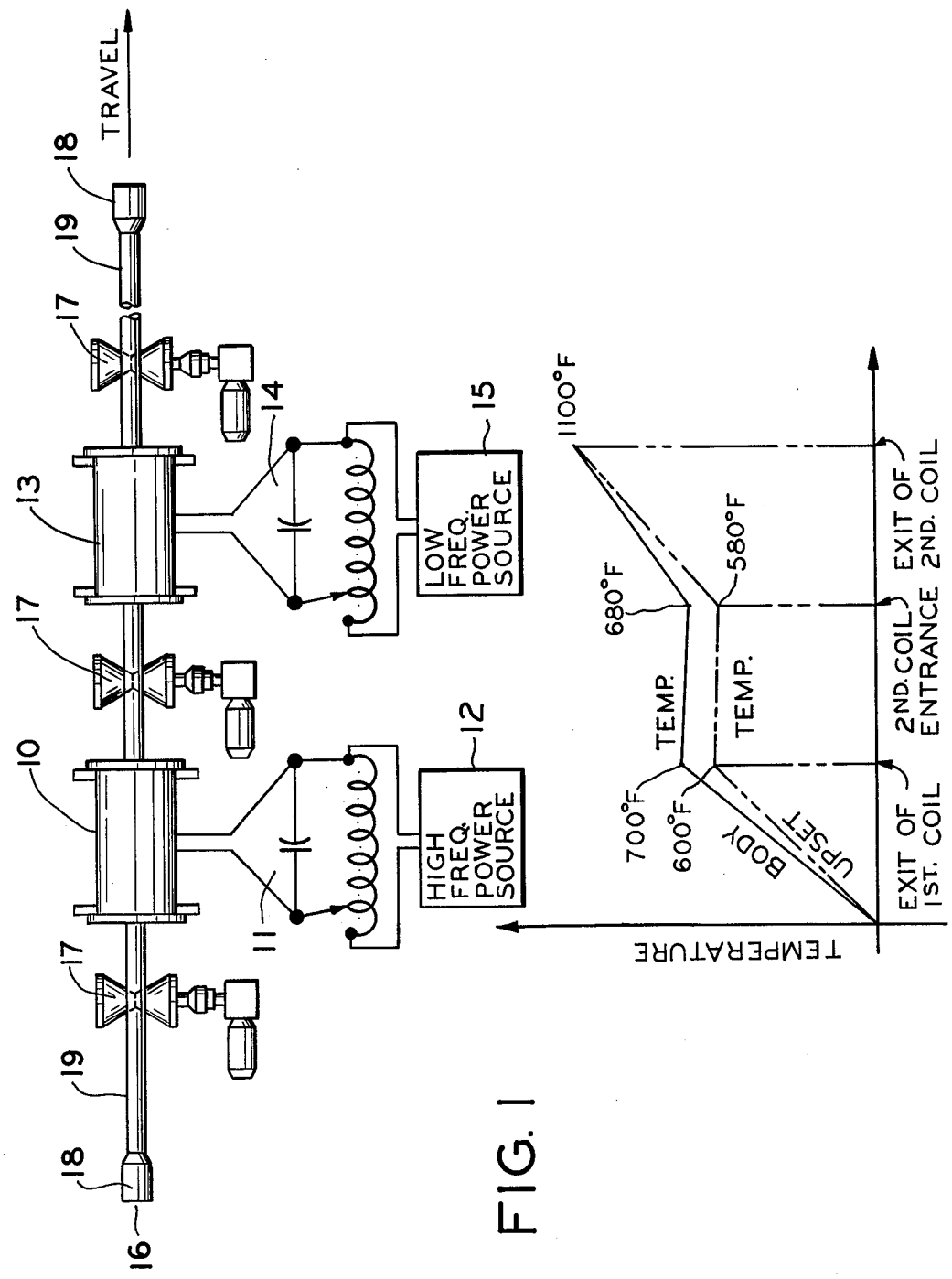

United States Patent [19]

Moliterno et al.

[11] 4,093,839

[45] June 6, 1978

[54] APPARATUS AND METHOD FOR INDUCTIVELY HEATING METALLIC TUBING HAVING AN UPSET PORTION

[75] Inventors: Louis J. Moliterno, Girard; Reuel E. Jennings, Warren, both of Ohio

[73] Assignee: Ajax Magnethermic Corporation, Warren, Ohio

[21] Appl. No.: 672,981

[22] Filed: Apr. 2, 1976

[51] Int. Cl.² .............................................. H05B 5/06
[52] U.S. Cl. ................................. 219/8.5; 219/10.41; 219/10.71; 219/10.75
[58] Field of Search .................. 219/8.5, 10.41, 10.75, 219/10.43, 10.67, 10.69, 10.71, 10.57; 266/124, 129

[56] References Cited

U.S. PATENT DOCUMENTS

| | | | |
|---|---|---|---|
| 2,408,190 | 9/1946 | Baker | 219/10.41 |
| 2,444,259 | 6/1948 | Jordan | 219/10.43 |
| 2,669,647 | 2/1954 | Segsworth | 219/10.75 |
| 3,057,985 | 10/1962 | Biringer | 219/10.75 |

*Primary Examiner*—Bruce A. Reynolds
*Attorney, Agent, or Firm*—J. H. Slough

[57] ABSTRACT

There is disclosed herein apparatus and method for heating metallic tubing having a thickened portion, by passing the same through an induction heater energized with power at a relatively high frequency whereby the temperature of the body of the tubing rises at a faster rate than the temperature of the said thickened portion and passing the said tubing through an induction heater energized with power at a relatively low frequency to cause the temperature of said thickened portion of the tubing to rise at a faster rate than the temperature of the body of the tubing, the ratio of the power applied at said low frequency relative to the power applied at said high frequency being such that said body and said thickened portion attain substantially the same predetermined final temperature upon exiting from said apparatus.

9 Claims, 2 Drawing Figures

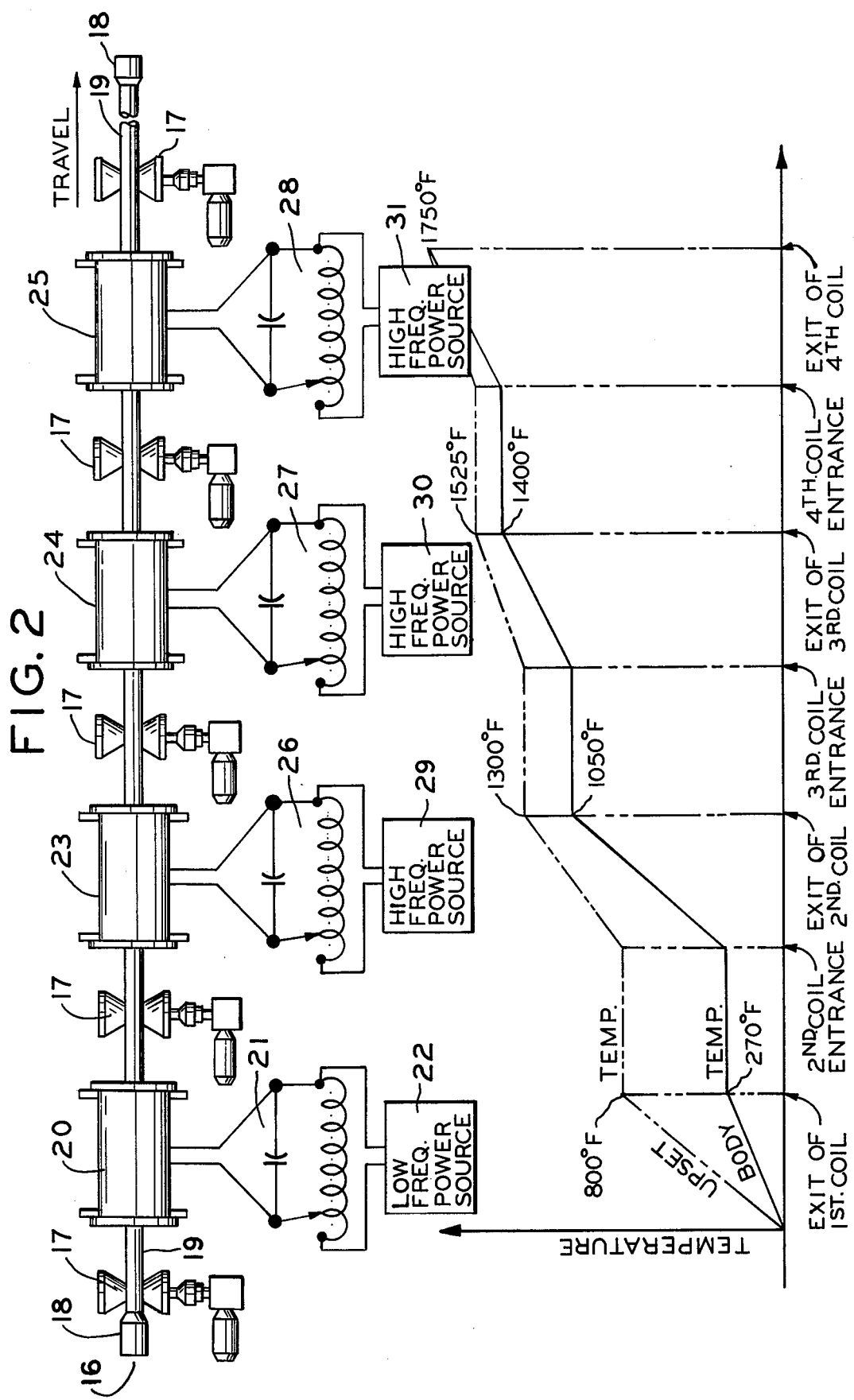

APPARATUS AND METHOD FOR INDUCTIVELY HEATING METALLIC TUBING HAVING AN UPSET PORTION

This invention relates to the inductive heating of metal tubular articles or pipe in which there is at least one portion having a different, principally greater, wall thickness than the wall thickness of the remaining pipe portions.

Induction heating of metal articles is well known for both hardening and tempering of metal. The proper combination of electrical frequency, power density and heating duration makes possible control of the degree of metal treatment from surface treatment to depth treatment. High frequency current is generally used when surface treatment is desired while lower frequencies, generally in the range of 60 to 180 cycles per second, are used for depth heating. Generally, the induced current in a hollow cylinder is at a maximum on its outer surface and decreases with increasing distance from the surface. The distribution of induced current is not only a direct effect of the frequency employed but is influenced also by the magnetic and electrical characteristics of the metal being heated. Since magnetic and electrical characteristics change with temperature, particularly at or near the curie or lower transformation temperature of magnetic metals, the induced current distribution will change as the work is heated. The problem of heating control is further complicated by the fact that heat generated at the metal surface progresses to the metal interior at different rates for different metals.

Heretofore, in normal usage dual frequencies were sometimes used for heating efficiency, low frequencies being used below the curie point and high frequencies being used above the curie point. This is well illustrated in U.S. Pat. No. 1,900,842, in which induction at different frequencies is used to heat magnetic metals in uniform rod, strip or tube form in successive temperature increments. The reference teaches that when temperatures below the curie point are desired, lower frequencies are required than when temperatures above the curie point are desired. In the latter case there is a choice "between raising the frequency of the entire equipment to a frequency which will be effective above the recallence point or raising the temperature in a part of the range required by an inductor operating at one frequency and utilizing higher frequency through the same or a separate inductor coil or coils to attain the higher temperatures." For continuous operation the "material to be heated is fed through at a rate such that with the energy available and at the frequency determined upon, it will reach the required temperature or a temperature just high enough to be at the proper temperature at the point of use as it emerges from the final coil or turn."

The improper selection of induction frequency can result in decreased electrical efficiency or in failure to heat a given article uniformly. Consequently, prior to this invention, parts with non-uniform sections have been difficult, if not unsuitable, for induction heating although sometimes changes in inductor design in static heating have compensated for heat pattern distortion caused by small changes in shape of the metal article where metal thickness was not substantially affected.

The principal object of this invention is to provide an apparatus and method for uniformly heating tubular metal objects having two or more basic wall thicknesses.

Of particular interest is the heating of upset tubing which differs from other previously known hollow cylinders in that upset tubing is prepared by forging an end of the tubing in such a manner that a short portion, generally in the range of 4 to 6 inches, has a heavier wall thickness than the body of the tube. Upset tubing is not to be confused with bell-ended or flanged tubing which involved primarily change of tube shape rather than change of wall thickness. External upsets have a larger outside diameter but the same inside diameter as the tube body. Internal upsets have a smaller inside diameter but the same outside diameter as the tube body. Heat treating of upset tubing, efficiently and uniformly, has not been possible prior to the introduction of the invention here disclosed. The upset end or ends, having greater mass than the tube body, tend to heat to a lower temperature than the body when using conventional gas or induction heating mass.

Another object of this invention then is to provide an apparatus and method by which uniform tube body and thickened portion temperatures can be attained in a single continuous progressive induction heating process, on one pipe section or consecutive pipe sections.

The heat treatment of metal sometimes involves at least two consecutive heating processes separated by a quench. The first process is a high-temperature process hardening process raising the metal temperature well above its curie point followed by a quench and a lower temperature tempering process in which the metal temperature is raised to less than its curie point.

Another object of this invention is to provide a continuous induction heating process which is readily adaptable to heating, quenching and tempering a metal piece.

Metals can be classified as magnetic and non-magnetic. While heat treatment of each class of metals require differing temperatures, the problems attendant uniform induction heating of upset tubing remain.

Therefore, another object of this invention is to provide a continuous induction heating process which is operative with both magnetic and non-magnetic metals.

These objects as well as others which are apparent from the following description are satisfied by this invention.

Most broadly, this invention is an apparatus and method for heating metallic tubing or pipe having at least one upset or relatively thickened portion, said apparatus comprising at least one heating means which will cause the temperature of the body of said tubing to rise at a faster rate than the temperature of the upset portion and at least one induction heating coil energized with power at a relatively low frequency which will cause the temperature of the upset portion to rise at a faster rate than the temperature of the body of the tubing, the various heating means being energized in such a manner that the body and upset portions of the tubing attain substantially the same predetermined final temperature upon exiting from said apparatus. Means which may be employed to heat the tube body at a greater rate than the tube thickened portion may be gas firing, resistance heating or induction heating. Preferably, however, the first type of heating means is also at least one induction heating coil energized with power at a relatively high frequency at the same time as the low frequency coil, to attain the same metalurgical properties in body and upset even though the geometrics of the body and upset are different. While the tubing can be fed through the subject apparatus intermittently if desired, the apparatus is particularly well suited for continuous feeding of consecutive sections of tubings therethrough, at some relatively uniform spacing. The apparatus and its method of use are also well suited for continuous quenching of the heated tubing.

The apparatus of this invention and its use can be more easily understood by reference to the drawings wherein:

FIG. 1 is a schematic drawing of an induction heating apparatus for tempering carbon steel upset tubing and a comparative temperature graph is illustrated to disclose the relative temperatures of the tubing body and upset during the heating thereof; and FIG. 2 is a schematic drawing of an induction heating apparatus for through hardening carbon steel upset tubing and a comparative temperature graph similar to that of FIG. 1 is illustrated to disclose the variant temperatures of the tubing body and upset as the same is progressively heated by the apparatus.

More specifically, in FIG. 1, an induction coil 10 is connected through a variable control 11 to a high frequency power source 12, and another induction coil 13 is connected through a variable control 14 to a low frequency power source 15. Tubing 16 having a body portion 19 of substantially uniform cross-sectional dimension throughout its length and provided with a thickened upset portion 18 adjacent at least one end thereof is continuously carried by driven rolls 17 progressively through induction heating coils 10 and 13. High frequency induction heating coil 10 is powered from a high frequency power source 12 and low frequency heating coil 13 is energized by a low frequency power source 15. As shown in FIG. 1, the body temperature is raised to a temperature of approximately 700° F. when passed through the induction coil 10 and the temperature of the upset 18 is raised to approximately 600° F. After an approximate 20° F. loss in each of the body 19 and upsets 18 during the passage of the tubing from the high frequency coil 10 to the low frequency coil 13, the temperature of both upsets 18 and body 19 becomes identical and are raised to 1100° F. for exit through the low frequency coil 13. Although the form of the invention shown in FIG. 1 discloses a single high frequency induction heater and a single low frequency induction heater, it will be understood that additional coils of each frequency are usually required. The frequencies employed in coils 10 and 13 are dictated by the total temperature rise desired in the tubing, the variation in tubing wall thickness between the body and each upset, and the period of exposure of each part of the tubing as affected by the size of each coil and the speed at which the pipe passes through the coils.

While FIG. 1 shows a high frequency coil 10 and a low frequency coil 13 in sequential routing, FIG. 2 shows a low frequency coil 20 followed by a plurality of high frequency coils 23, 24 and 25. More specifically, a low frequency induction coil 20 is conneted through a variable control 21 to a low frequency power source 22, and high frequency induction coils 23, 24 and 25 are connected through variable controls, 26, 27 and 28 respectively to high frequency power sources 29, 30 and 31. Upset tubing 16 is continuously carried by driven rolls 17 progressively through coils 20, 23, 24 and 25. Proper control of the coils makes possible the heating of the tubing upset 18 to 800° F. and of the tubing body 19 to 270° F. on passing through the low frequency coil 20. With minimal heat loss between coils, the tubing upsets 18 are heated to 1300° F. and 1750° F as it passes through high frequency coils 23, 24 and 25 respectively while the body 19 is heated respectively to 1050° F., 1400° F. and 1750° F. Obviously, any common continuous quench can be added following coil 25. Also, the tempering apparatus illustrated in FIG. 1 can be added after such quench. Here again, a plurality of coils of low and high frequency are usually required. Low frequency and high frequency coils can be alternated if it is desired to keep the tubing upset and body at approximately the same temperature throughout the heating process as well as at the exit point. Locating the low frequency coil or coils at the loading end or beginning of the heating line provides a more efficient use of electric power and locating the low frequency coil or coils at the end of the heating line aids in reducing the final radial temperature differential between the surface and center of both the tubing body and tubing upsets.

It will be noted that while low frequency induction heating has not heretofore been commonly used with non-magnetic metals because of cost, low frequency induction heating is useful for heating both magnetic and non-magnetic metals in the apparatus and method of this invention.

This invention takes full advantage of certain characteristics of heat induction processes. Control of the induction coil frequencies can minimize inefficient heating of metal by avoiding as much as possible the tendency in heating a hollow cylinder to naturally induce currents to a greater depth than the wall thickness of the tubing body, if a greater tube depth were available. By proper combination of high frequencies, which heat the tubing body efficiently but underheat the tubing aspects, and low frequencies, which heat the tubing aspects efficiently but underheat the tubing body, upset tubing can be heated in a continuous manner to a uniform temperature. Because power levels at each frequency can be varied in accordance with this invention when tubing of varying body and upset wall thicknesses are processed, a unique and different ratio of high frequency to low frequency power which will be necessary for uniform heating for each given upset tube size can be accommodated with the same power system. In like manner, a unique and different ratio of heat rate of non-inductive means to power of inductive means will be necessary for uniform heating for each given upset tube size and can be accommodated with a power system which mixes inductive and non-inductive means.

In the interest of repeatability of heat pattern in consecutive sections of tube run progressively with variable air gaps between consecutive sections, a minimum gap must be maintained. This gap should be at least ¼ of the longest coil length used in a progressive coil line.

We claim:

1. Apparatus for progressively inductively heating metallic tubing having at least one relatively thickened portion, comprising at least one induction heating coil energized with power at a relatively high frequency which will cause the temperature of the body of the tubing to rise at a faster rate than the temperature of said thickened portion, and at least one induction heating coil energized with power at a relatively low frequency which will cause the temperature of said thickened portion of the tubing to rise at a faster rate than the temperature of the body of the tubing, means to adjust the ratio of the power applied at said low frequency relative to the power applied at the high frequency so that said body and said thickened portion attain substantially the same predetermined final temperature upon exiting from said apparatus.

2. The apparatus of claim 1 including means for continuously passing said tubing through all of said induction heating coils.

3. The apparatus of claim 1 wherein there is a quenching means following the last induction coil.

4. Method for progressively inductively heating sections of metallic tubing, each section having at least one relatively thickened portion, comprising passing said tubing through at least one induction heating coil energized with power at a relatively high frequency causing the temperature of the body of the tubing to rise at a faster rate than the temperature of said thickened portion, and passing said tubing through at least one induction heating coil energized with power at a relatively low frequency causing the temperature of said thickened portion of the tubing to rise at a faster rate than the temperature of the body, the ratio of the power applied at said low frequency relative to the power applied at said high frequency being such that said body and said thickened portion of each section attain substantially the same predetermined final temperature upon exiting from the last of said coils.

5. The method of claim 4 wherein the body outside diameters and wall thicknesses and the outside diameters and wall thicknesses of said thickened portions of all tubing sections are respectively identical.

6. The method of claim 5 wherein said sections of metallic tubing are passed through said heating coils consecutively in close proximity to each other.

7. The method of claim 6 wherein each section of said tubing is separated from each consecutive section of tubing by a distance equal to at least one quarter the length of the longest of said induction heating coils.

8. The method of claim 4 wherein each section of heated tubing is quenched following the final heating step.

9. Apparatus for progressively heating metallic tubing having at least one relatively thickened portion, comprising at least one heating means which will cause the temperature of the body of the tubing to rise at a faster rate than the temperature of said thickened portion, and at least one induction heating coil energized with power at a frequency which will cause the temperature of said thickened portion of the tubing to rise at a faster rate than the temperature of the body of the tubing, means to adjust the ratio of the power applied to said induction coil relative to the heating rate applied by said first heating means so that said body and said thickened portion attain substantially the same predetermined final temperature upon exiting from said apparatus.

* * * * *